US008065234B2

(12) United States Patent
Liao et al.

(10) Patent No.: US 8,065,234 B2
(45) Date of Patent: *Nov. 22, 2011

(54) METHODS AND SYSTEMS OF PREDICTING MORTGAGE PAYMENT RISK

(75) Inventors: Yuansong Liao, Bellevue, WA (US); Rui Yan, San Marcos, CA (US)

(73) Assignee: Corelogic Information Solutions, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,517

(22) Filed: Jun. 16, 2011

(65) Prior Publication Data

US 2011/0251945 A1    Oct. 13, 2011

Related U.S. Application Data

(63) Continuation of application No. 12/246,407, filed on Oct. 6, 2008, now Pat. No. 7,966,256, which is a continuation of application No. 11/526,208, filed on Sep. 22, 2006, now Pat. No. 7,587,348.

(60) Provisional application No. 60/785,902, filed on Mar. 24, 2006, provisional application No. 60/831,788, filed on Jul. 18, 2006, provisional application No. 60/978,033, filed on Oct. 5, 2007.

(51) Int. Cl.
*G06Q 40/00* (2006.01)

(52) U.S. Cl. ............................. 705/44; 705/35; 705/38

(58) Field of Classification Search .............. 705/35–45
See application file for complete search history.

(56) References Cited

U.S. PATENT DOCUMENTS

| 5,819,226 | A | 10/1998 | Gopinathan et al. | |
|---|---|---|---|---|
| 6,134,532 | A | 10/2000 | Lazarus et al. | |
| 6,185,543 | B1 * | 2/2001 | Galperin et al. | 705/38 |
| 6,330,546 | B1 | 12/2001 | Gopinathan et al. | |
| 6,430,539 | B1 | 8/2002 | Lazarus et al. | |
| 6,658,393 | B1 * | 12/2003 | Basch et al. | 705/38 |
| 6,728,695 | B1 | 4/2004 | Pathria et al. | |
| 6,839,682 | B1 | 1/2005 | Blume et al. | |

(Continued)

FOREIGN PATENT DOCUMENTS

CA    1252566    4/1989

(Continued)

OTHER PUBLICATIONS

"Formula by example" software expands analysis power of Lotus 1-2-3 for Windows, dated Nov. 11, 1991, News Release, p. 1, Wes Thomas, Thomas Public Relations.*

(Continued)

*Primary Examiner* — Ella Colbert
*Assistant Examiner* — Hai Tran
(74) *Attorney, Agent, or Firm* — Knobbe, Martens, Olson & Bear LLP

(57) ABSTRACT

Disclosed herein are methods and systems for detecting a risk of payment default. In various embodiments, the systems/methods receive mortgage data associated with a mortgage application of an applicant, generate one or more models based on data related to historical mortgage transactions and determine a payment default risk score based at least partly on the one or more generated models, the mortgage data associated with the mortgage application, and the credit data related to the applicant. In another embodiment, a system is disclosed for selecting mortgage applications for further fraud evaluation based on the determined risks of early payment default associated with the mortgage applications and performing the fraud evaluation on those selected mortgage applications.

24 Claims, 10 Drawing Sheets

U.S. PATENT DOCUMENTS

| | | | |
|---|---|---|---|
| 7,165,037 | B2 | 1/2007 | Lazarus et al. |
| 7,392,216 | B1 | 6/2008 | Palmgren et al. |
| 2002/0052836 | A1 | 5/2002 | Galperin et al. |
| 2002/0133371 | A1 | 9/2002 | Cole |
| 2002/0133721 | A1 | 9/2002 | Adjaoute |
| 2002/0194119 | A1 | 12/2002 | Wright et al. |
| 2003/0093366 | A1 | 5/2003 | Halper et al. |
| 2004/0010443 | A1* | 1/2004 | May et al. .............. 705/10 |
| 2004/0138993 | A1 | 7/2004 | DeFrancesco et al. |
| 2004/0236696 | A1 | 11/2004 | Aoki et al. |
| 2005/0108025 | A1 | 5/2005 | Cagan |
| 2006/0059073 | A1 | 3/2006 | Walzak |
| 2006/0149674 | A1 | 7/2006 | Cook et al. |
| 2007/0288357 | A1 | 12/2007 | Holman et al. |
| 2008/0010188 | A1 | 1/2008 | Beardsell et al. |

FOREIGN PATENT DOCUMENTS

| | | |
|---|---|---|
| CA | 2032126 | 8/1993 |
| CA | 2052033 | 1/1999 |
| EP | 1450321 A | 8/2004 |
| WO | WO /0177959 | 10/2001 |
| WO | WO 02/37219 A3 | 5/2002 |
| WO | WO 2002/037219 A3 | 5/2002 |
| WO | WO/02/097563 A2 | 12/2002 |
| WO | WO 2007/002702 | 1/2007 |

OTHER PUBLICATIONS

"Fraud Detection in the Financial Industry", A SAS Institute Best Practices Paper, 32 pages.
Garavaglia, Susan, "An Application of a Counter-Propagation Neural Network: Simulating the Standard & Poor's Corporate Bond Rating System", IEEE 1991, pp. 278-287.
Congressional Testimony of Chris Swecker, Assistant Director, Criminal Investigative Division, Federal Bureau of Investigation, before the House Financial Services Subcommittee on Housing and Community Opportunity, Oct. 7, 2004, 5 pages.
"New Business Uses for Neurocomputing", I/S Analyzer, Feb. 1990, vol. 28, No. 2, 15 pages.
Ghosh, Sushmito and Reilly, Douglas L., "Credit Card Fraud Detection with a Neural-Network", IEEE 1994, pp. 621-630.
Neal, Mark, Hunt, John and Timmis, Jon, "Augmenting an Artificial Immune Network", IEEE 1998, pp. 3821-3826.
Klimasauskas, Casimir C., "Neural Networks: A Short Course", PC AI, Nov./Dec. 1988, pp. 26-30.
Klimasauskas, Casimir C., "Applying Neural Networks Part 1: An Overview of the Series", PC AI, Jan. Feb. 1991, pp. 30-33.
Klimasauskas, Casimir C., "Applying Neural Networks Part 2: A Walk Through the Application Process", PC AI, Mar./Apr. 1991, pp. 27-34.
Klimasauskas, Casimir C., "Applying Neural Networks Part III: Training a Neural Network", PC AI, May/Jun. 1991, pp. 20-24.
Klimasauskas, Casimir C., "Applying Neural Networks Part IV: Improving Performance", PC AI Jul./Aug. 1991, pp. 34-41.
Klimasauskas, Casimir C., "Applying Neural Networks Part V: Integrating a Trained Network into an Application", PC AI Sep./Oct. 1991, pp. 36-41.
Klimasauskas, Casimir C., "Applying Neural Networks Part VI: Special Topics", PC AI Nov./Dec. 1991, pp. 46-49.
J. Killin. "Combatting credit card fraud with knowledge based systems." In Compsec 90 International. Elsevier Advanced Technology, Oxford, Oct. 1990.
GB Search Report for GB0705653.4 dated Jun. 22, 2007, 4 pages.
PCT Search Report of PCT/US08/78987 dated Dec. 5, 2008, 8 pages.
""Formula by example" software expands analysis power of Lotus 1-2-3 For Windows", dated Nov. 11, 1991, News Release, p. 1, Wes Thomas, Thomas Public Relations.
"Fraud Detection in the Financial Industry", A SAS Institute Best Practices Paper, 32 pages.
Garavaglia, Susan, "An Application of a Counter-Propagation Neural Network: Simulating the Standard & Poor's Corporate Bond Rating System", IEEE 1991, pp. 278-287.
Congressional Testimony of Chris Swecker, Assistant Director, Criminal Investigative Division, Federal Bureau of Investigation, before the House Financial Services Subcommittee on Housing and Community Opportunity, Oct. 7, 2004, 5 pages.
"New Business Uses for Neurocomputing", I/S Analyzer, Feb. 1990, vol. 28, No. 2, 15 pages.
Ghosh, Sushmito and Reilly, Douglas L., "Credit Card Fraud Detection with a Neural-Network", IEEE 1994, pp. 621-630.
Neal, Mark, Hunt, John and Timmis, Jon, "Augmenting an Artificial Immune Network", IEEE 1998, pp. 3821-3826.
Klimasauskas, Casimir C., "Neural Networks: A Short Course", PC AI, Nov./Dec. 1988, pp. 26-30.
Klimasauskas, Casimir C., "Applying Neural Networks Part 1: An Overview of the Series", PC AI, Jan. Feb. 1991, pp. 30-33.
Klimasauskas, Casimir C., "Applying Neural Networks Part 2: A Walk Through the Application Process", PC AI, Mar./Apr. 1991, pp. 27-34.
Klimasauskas, Casimir C., "Applying Neural Networks Part III: Training a Neural Network", PC AI, May/Jun. 1991, pp. 20-24.
Klimasauskas, Casimir C., "Applying Neural Networks Part IV: Improving Performance", PC AI Jul./Aug. 1991, pp. 34-41.
Klimasauskas, Casimir C., "Applying Neural Networks Part V: Integrating a Trained Network into an Application", PC AI Sep./Oct. 1991, pp. 36-41.
Klimasauskas, Casimir C., "Applying Neural Networks Part VI: Special Topics", PC AI Nov./Dec. 1991, pp. 46-49.
J. Killin. "Combatting credit card fraud with knowledge based systems." In Compsec 90 International. Elsevier Advanced Technology, Oxford, Oct. 1990.
GB Search Report for GB0705653.4 dated Jun. 22, 2007, 4 pages.
PCT Search Report of PCT/US08/78987 dated Dec. 5, 2008, 8 pages.
""Formula by example" software expands analysis power of Lotus 1-2-3 for Windows", dated Nov. 11, 1991, News Release, p. 1, Wes Thomas, Thomas Public Relations.

* cited by examiner

METHODS AND SYSTEMS OF PREDICTING MORTGAGE PAYMENT RISK

CROSS-REFERENCE TO RELATED APPLICATIONS

This application is a continuation of U.S. patent application Ser. No. 12/246,407, filed Oct. 6, 2008 and entitled "Methods and Systems for Predicting Mortgage Payment Risk," now issued as U.S. Pat. No. 7,966,256, which is a continuation-in-part of U.S. patent application Ser. No. 11/526,208, filed Sep. 22, 2006 and entitled "System and Method for Detecting Mortgage Related Fraud," now issued as U.S. Pat. No. 7,587,348, which in turn claims the benefit under 35 U.S.C. §119(e) of U.S. Provisional Patent Application No. 60/785,902, filed Mar. 24, 2006 and U.S. Provisional Patent Application No. 60/831,788, filed on Jul. 18, 2006. All of the above applications are incorporated by reference in their entirety as if set forth in full. This application also claims the benefit under 35 U.S.C. §119(e) of U.S. Provisional Patent Application No. 60/978,033, filed Oct. 5, 2007 and entitled "Method and System of Predicting Mortgage Defaults," which is also incorporated herein by reference in its entirety as if set forth in full.

BACKGROUND OF THE INVENTION

1. Field of the Invention

The embodiments described herein relate to determining or predicting the likelihood of payment defaults in financial transactions.

2. Description of the Related Art

Fraud detection systems detect fraud in financial transactions. For example, a mortgage fraud detection system can be configured to analyze loan application data to identify applications that are being obtained using fraudulent application data.

Existing fraud detection systems, however, have failed to keep pace with the dynamic nature of financial transactions and mortgage application fraud. Moreover, such systems have failed to take advantage of the increased capabilities of computer systems.

Additionally, there currently are no effective systems for detecting the probability of payment default, such as early payment default (EPD). EPD, for example, can have a large impact on a lender. Beyond the obvious lost revenue potential, EPD can generally reduce the value of loans in the secondary market. If EPD, as well as longer term defaults, can be reduced or eliminated, then there will be less inherent risk in the loans and the overall value of the loans should increase.

SUMMARY OF THE INVENTION

A system for the detection of a risk of payment default based on historical mortgage data is described herein.

According to one aspect, a method for detecting a risk of payment default comprises receiving mortgage data associated with a mortgage application, the mortgage data associated with an applicant, determining a first score for the mortgage data based at least partly on one or more models that are based on data from a plurality of historical mortgage transactions and based on historical credit information related to the applicant, and generating data indicative of a risk of payment default based at least partly on the first score.

According to another aspect, a method for detecting a risk of payment default comprises receiving mortgage data associated with a plurality of mortgage applications, each mortgage application associated with an applicant; determining a plurality of first scores for the mortgage data for each of the plurality of mortgage applications based at least partly on one or more models that are based on data from a plurality of historical mortgage transactions and based on historical credit information related to the applicant; generating data indicative of a risk of payment default for each of the plurality of mortgage applications; prioritizing the mortgage applications based on the plurality of data generated; determining a plurality of second scores for the mortgage data for each of the plurality of mortgage applications based at least partly on one or more models that are based on data from a plurality of historical mortgage transactions; and generating data indicative of a risk of fraud for each of the prioritized mortgage applications based at least partly on the second score.

According to still another aspect, a system for detecting a risk of payment default comprises a storage configured to receive mortgage data associated with a mortgage application, the mortgage applications associated with an applicant; and a processor coupled with the storage, the processor configured to determine a first score for the mortgage data based at least partly on one or more models that are based on data from a plurality of historical mortgage transactions and based on historical credit information related to the applicant, and generate data indicative of a risk of payment default based at least partly on the first score.

According to still another aspect, a system for detecting a risk of payment default comprises a storage configured to receive mortgage data associated with a plurality of mortgage applications, each of the plurality of mortgage applications associated with an applicant; and a processor coupled with the storage, the processor configured to determine a plurality of first scores for the mortgage data for each of the plurality of mortgage applications based at least partly on one or more models that are based on data from a plurality of historical mortgage transactions and based on historical credit information related to the applicant, generate data indicative of a risk of payment default for each of the plurality of mortgage applications based at least partly on the first score, prioritize the mortgage applications based on the plurality of data generated, determine a plurality of second scores for the mortgage data for each of the plurality of mortgage applications based at least partly on one or more models that are based on data from a plurality of historical mortgage transactions, and generate data indicative of a risk of fraud for each of the prioritized mortgage applications based at least partly on the second score.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION OF THE PREFERRED EMBODIMENT

Figure 1:
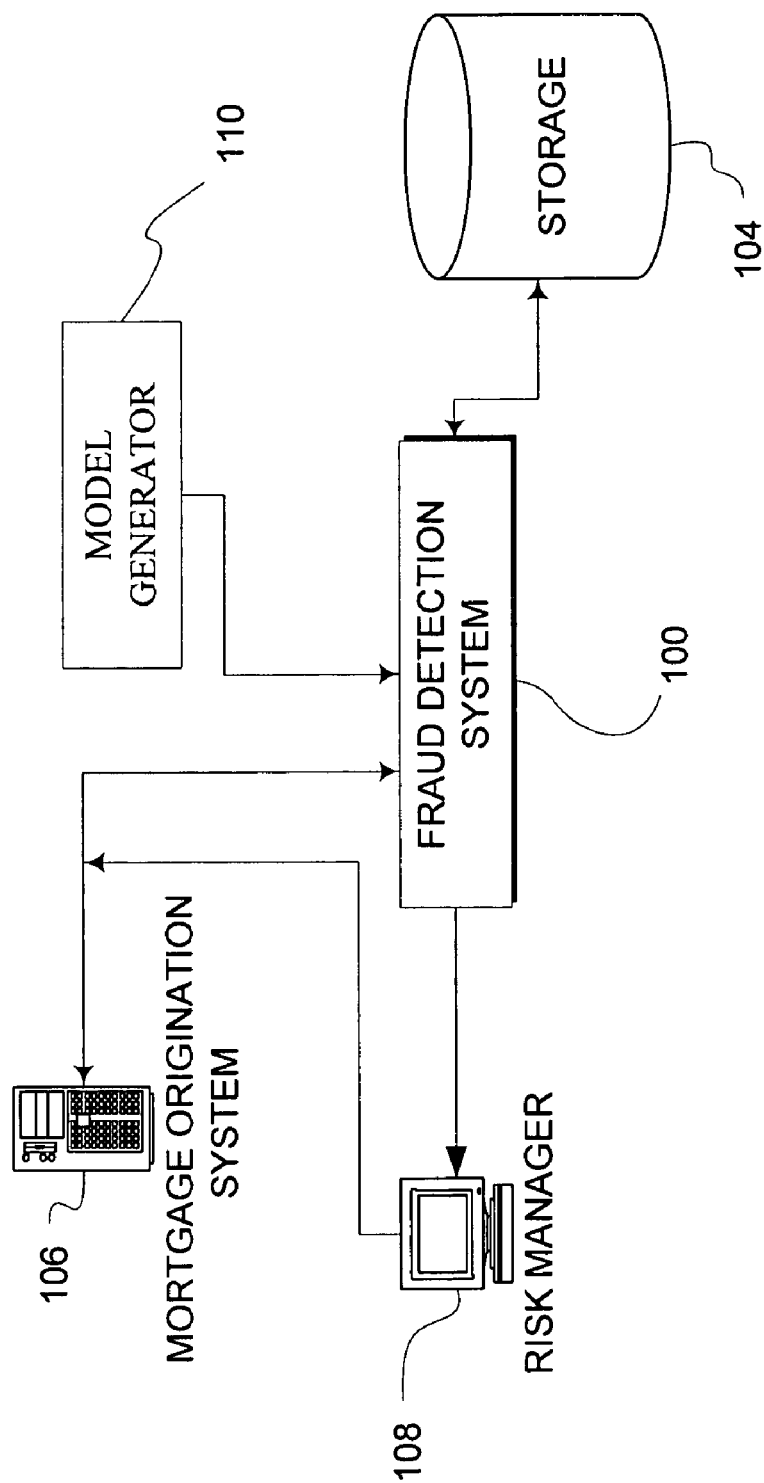
FIG. 1 is a functional block diagram illustrating a fraud detection system such as for use with a mortgage origination system in accordance with one embodiment.

The following detailed description is directed to certain specific embodiments, but it will be understood that the systems and methods described herein can be embodied in a multitude of different ways as defined and covered by the claims. For example, certain embodiments described herein are described generally in relation to Early Payment Default (EPD). But it will be understood that these same embodiments can be applied to payment default that can occur at any period during the loan. Accordingly, nothing in the description that follows should be seen as limiting the systems and methods described herein to EPD situations.

Further, while the systems and methods herein are described in relation to mortgage applications, or mortgage transactions, it will be understood that this by way of example only and that the systems and methods described herein can extend to other types of transactions.

In this description, reference is made to the drawings wherein like parts are designated with like numerals throughout.

Existing fraud detection systems can use transaction data in addition to data related to the transacting entities to identify fraud. Such systems can operate in either batch (processing transactions as a group of files at periodic times during the day) or real time mode (processing transactions one at a time, as they enter the system). However, the fraud detection capabilities of existing systems have not kept pace with either the types of fraudulent activity that have evolved or increasing processing and storage capabilities of computing systems.

For example, it has been found that, as discussed with reference to some embodiments, fraud detection can be improved by using stored past transaction data in place of, or in addition to, summarized forms of past transaction data. In addition, in one embodiment, fraud detection can be improved by using statistical information that is stored according to groups of individuals that form clusters. In one such embodiment, fraud can be identified with reference to deviation from identified clusters. In one embodiment, in addition to data associated with the mortgage applicant, embodiments of mortgage fraud detection systems can use data that is stored in association with one or more entities associated with the processing of the mortgage transaction such as brokers, appraisers, or other parties to mortgage transactions. The entities can be real persons or can refer to business associations, e.g., a particular appraiser, or an appraisal firm. Fraud generally refers to any material misrepresentation associated with a loan application and can include any misrepresentation which leads to a higher probability for the resulting loan to default or become un-sellable or require discount in the secondary market.

Mortgages can include residential, commercial, or industrial mortgages. In addition, mortgages can include first, second, home equity, or any other loan associated with a real property. In addition, it is to be recognized that other embodiments can also include fraud detection in other types of loans or financial transactions.

Exemplary applications of fraud detection relate to credit cards, debit cards, and mortgages. Furthermore, various patterns can be detected from external sources, such as data available from a credit bureau or other data aggregator.

FIG. 1 is a functional block diagram illustrating a fraud detection system 100 such as for use with a mortgage origination system 106. In other embodiments, the system 100 can be used to analyze applications for use in evaluating applications and/or funded loans by an investment bank or as part of due diligence of a loan portfolio. The fraud detection system 100 can receive and store data in a storage 104. The storage 104 can comprise one or more database servers and any suitable configuration of volatile and persistent memory. The fraud detection system 100 can be configured to receive mortgage application data from the mortgage origination system 106 and provide data indicative of fraud back to the mortgage origination system 106. In one embodiment, the fraud detection system 100 uses one or more models to generate the data indicative of fraud. In one embodiment, data indicative of fraud can also be provided to a risk manager system 108 for further processing and for analysis by a human operator. The analysis system 108 can be provided in conjunction with the fraud detection system 100 or in conjunction with the mortgage origination system 106.

A model generator 110 can provide models to the fraud detection system 100. In one embodiment, the model generator 110 can provide the models periodically to the system 100, such as when new versions of the system 100 are released to a production environment. In other embodiments, at least a portion of the model generator 110 can be included in the system 100 and configured to automatically update at least a portion of the models in the system 100.

Figure 2:
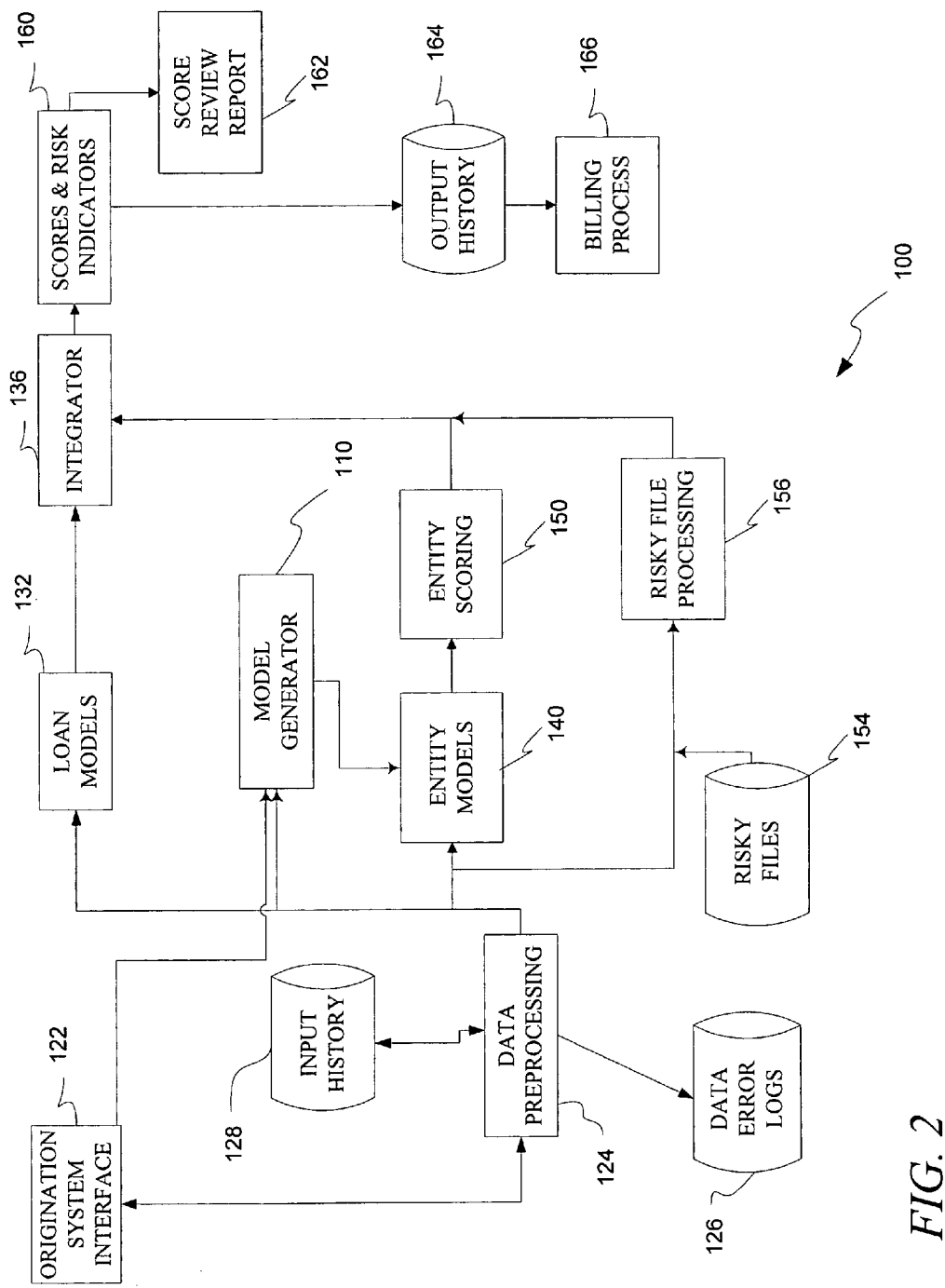
FIG. 2 is a functional block diagram illustrating an example of the fraud detection system of FIG. 1 in more detail in accordance with one embodiment.

FIG. 2 is a functional block diagram further illustrating an example of the fraud detection system 100. The system 100 can include an origination system interface 122 providing mortgage application data to a data preprocessing module 124. The origination system interface 122 can receive data from the mortgage origination system 106 of FIG. 1. In other embodiments, the origination system interface 122 can be configured to receive data associated with funded mortgages and can be configured to interface with suitable systems other than, or in addition to, mortgage origination systems. For example, in one embodiment, the system interface 122 can be configured to receive "bid tapes" or other collections of data associated with funded mortgages for use in evaluating fraud associated with a portfolio of funded loans. In one embodiment the origination system interface 122 comprises a computer network that communicates with the origination system 106 to receive applications in real time or in batches. In one embodiment, the origination system interface 122 receives batches of applications via a data storage medium. The origination system interface 122 provides application data to the data preprocessing module 124 which formats application data into data formats used internally in the system 100. For example, the origination system interface 122 can also provide data from additional sources such as credit bureaus that can be in different formats for conversion by the data preprocessing module 124 into the internal data formats of the system 100.

The origination system interface 122 and preprocessing module 124 can also allow at least portions of a particular embodiment of the system 100 to be used to detect fraud in different types of credit applications and for different loan originators that have varying data and data formats. Table 1 lists examples of mortgage application data that can be used in various embodiments.

TABLE 1

Examples of Mortgage Data.

| Field Name | Field Description |
|---|---|
| portfolio_id | Specifies which model was executed |
| client_discretionary_field | Reserved for client use |
| loan_no | Unique Identifier for Loans |
| appl_date | Application Date |
| appraisal_value | Appraisal Value |
| borr_last_name | Borrower Last Name |
| borr_home_phone | Borrower Home Phone |
| borr_ssn | Borrower Social Security Number |
| coborr_last_name | Co-Borrower Last Name |
| coborr_ssn | Co-Borrower SSN |
| doc_type_code | Numeric Code For Documentation Type (Stated, Full, Partial, etc) |
| credit_score | Credit Risk Score |
| loan_amount | Loan Amount |
| prop_zipcode | Five Digit Property Zip Code |
| status_desc | Loan Status |
| borr_work_phone | Borrower Business Phone Number |
| borr_self_employed | Borrower Self Employed (Yes/No) |
| borr_income | Borrower Monthly Income |
| purpose_code | Loan Purpose (Refi (1st, 2nd) or Purchase (1st, 2nd)) |
| borr_prof_yrs | Borrower's Number of Years in this Profession |
| acct_mgr_name | Account Manager name |
| ae_code | Account Executive identifier (can be name or code) |
| category_desc | Category Description |
| loan_to_value | Loan to Value Ratio |
| combined_ltv | Combined Loan to Value Ratio |
| status_date | Status Date |
| borrower_employer | Borrower Employer's Name |
| borrower_first_name | Borrower first name |
| coborr_first_name | Co-Borrower first name |
| mail_address | Borrower mailing street address |
| mail_city | Borrower mailing city |
| mail_state | Borrower mailing state |
| mail_zipcode | Borrower mailing address zipcode |
| prop_address | Property street address |
| prop_city | Property city |
| prop_state | Property state |
| Back_end_ratio | Back End Ratio |
| front_end_ratio | Front End Ratio |
| Appraiser Data | |
| appr_code | Unique identifier for appraiser |
| appr_first_name | Appraiser first name |
| appr_last_name | Appraiser last name |
| appr_tax_id | Appraiser tax ID |
| appr_license_number | Appraiser License Number |
| appr_license_expiredate | Appraiser license expiration date |
| appr_license_state | Appraiser license state code |
| company_name | Appraiser company name |
| appr_cell_phone | Appraiser cell phone |
| appr_work_phone | Appraiser work phone |
| appr_fax | Appraiser fax number |
| appr_address | Appraiser current street address |
| appr_city | Appraiser current city |
| appr_state | Appraiser current state |
| appr_zipcode | Appraiser current zip code |
| appr_status_code | Appraiser status code |
| appr_status_date | Date of appraiser's current status |
| appr_email | Appraiser e-mail address |
| Broker Data | |
| brk_code | Broker Identifier |
| broker_first_name | Broker first name (or loan officer first name) |

TABLE 1-continued

Examples of Mortgage Data.

| Field Name | Field Description |
|---|---|
| broker_last_name | Broker last name (or loan officer last name) |
| broker_tax_id | Broker tax ID |
| broker_license_number | Broker license number |
| broker_license_expiredate | Broker license expiration date |
| broker_license_state | Broker license state code |
| company_name | Broker company name |
| brk_cell_phone | Broker cell phone |
| brk_work_phone | Broker work phone |
| brk_fax | Broker fax number |
| brk_address | Broker current street address |
| brk_city | Broker current city |
| brk_state | Broker current state |
| brk_zipcode | Broker current zip code |
| brk_status_code | Broker status code |
| brk_status_date | Date of broker's current status |
| brk_email | Broker e-mail address |
| brk_fee_amount | Broker fee amount |
| brk_point_amount | Broker point amount |
| program_type_desc | Program Type Description |
| loan_disposition | Final disposition of loan during application process: FUNDED - approved and funded NOTFUNDED - approved and not funded FRAUDDECLINE - confirmed fraud and declined CANCELLED - applicant withdrew application prior to any risk evaluation or credit decision PREVENTED - application conditioned for high risk/suspicion of misrepresentation and application was subsequently withdrawn or declined (suspected fraud but not confirmed fraud) DECLINED - application was declined for non-fraudulent reasons (e.g. credit risk) FUNDFRAUD - application was approved and funded and subsequently found to be fraudulent in post-funding QA process |

The preprocessing module 124 can be configured to identify missing data values and provide data for those missing values to improve further processing. For example, the preprocessing module 124 can generate application data to fill missing data fields using one or more rules. Different rules can be used depending on the loan data supplier, on the particular data field, and/or on the distribution of data for a particular field. For example, for categorical fields, the most frequent value found in historical applications can be used. For numerical fields, the mean or median value of historical applications can be used. In addition, other values can be selected such as a value that is associated with the highest risk of fraud (e.g., assume the worst) or a value that is associated with the lowest risk of fraud (e.g., assume the best). In one embodiment, a sentinel value, e.g., a specific value that is indicative of a missing value to one or more fraud models can be used (allowing the fact that particular data is missing to be associated with fraud). The preprocessing module 124 can also be configured to identify erroneous data or missing data. In one embodiment, the preprocessing module 124 extrapolates missing data based on data from similar applications, similar applicants, or using default data values. The preprocessing module 124 can perform data quality analysis such as one or more of critical error detection, anomaly detection, and data entry error detection. In one embodiment, applications failing one or more of these quality analyses can be logged to a data error log database 126.

In critical error detection, the preprocessing module 124 identifies applications that are missing data that the absence of which is likely to confound further processing. Such missing data can include, for example, appraisal value, borrower credit score, or loan amount. In one embodiment, no further processing is performed and a log or error entry is stored to the database 126 and for provided to the loan origination system 106.

In anomaly detection, the preprocessing module 124 identifies continuous application data values that can be indicative of data entry error or of material misrepresentations. For example, high loan or appraisal amounts (e.g., above a threshold value) can be indicative of data entry error or fraud. Other anomalous data can include income or age data that is outside selected ranges. In one embodiment, such anomalous data can be logged and the log provided to the origination system 106. In one embodiment, the fraud detection system 100 continues to process applications with anomalous data. The presence of anomalous data can be logged to the database 126 and/or included in a score output or report for the corresponding application.

In data entry detection, the preprocessing module 124 can be configured to identify non-continuous data such as categories or coded data that appear to have data entry errors. For example, telephone numbers or zip codes that have too many or too few digits, incomplete social security numbers, toll free numbers as home or work numbers, or other category data that fails to conform to input specifications can be logged. The presence of anomalous data can be logged to the database 126 and/or included in a score output or report for the corresponding application.

In one embodiment, the preprocessing module 124 can be configured to query an input history database 128 to determine if the application data is indicative of a duplicate application. A duplicate can indicate either resubmission of the same application fraudulently or erroneously. Duplicates can be logged. In one embodiment, no further processing of duplicates is performed. In other embodiments, processing of duplicates continues and can be noted in the final report or score. If no duplicate is found, the application data is stored to the input history database 124 to identify future duplicates.

The data preprocessing module 124 provides application data to one or more models for fraud scoring and processing. In one embodiment, application data is provided to one or more loan models 132 that generate data indicative of fraud based on application and applicant data. The data indicative of fraud generated by the loan models 132 can be provided to an integrator 136 that combines scores from one or more models into a final score. The data preprocessing module 124 can also provide application data to one or more entity models 140 that are configured to identify fraud based on data associated with entities involved in the processing of the application. Entity models can include models of data associated with loan brokers, loan officers or other entities involved in a loan application.

More examples of such entity models 140 are illustrated with reference to FIG. 4. Each of the entity models can output data to an entity scoring module 150 that is configured to provide a score and/or one or more risk indicators associated with the application data. The entity scoring module 150 can provide scores associated with one or more risk indicators associated with the particular entity or application.

The term "risk indicator" refers to data values identified with respect to one or more data fields that can be indicative of fraud. For example, appraisal value in combination with zip code can be a risk indicator associated with an appraiser model. In one embodiment, the entity scoring module 150 provides scores and indicators to the integrator 136 to generate a combined fraud score and/or set of risk indicators.

In one embodiment, the selection of risk indicators are based on criteria such as domain knowledge, and/or correlation coefficients between entity scores and fraud rate, if entity fraud rate is available. Correlation coefficient between entity score $s^i$ for risk indicator j and entity fraud rate f is defined as $$r_i = \frac{\sum_{j=i}^{N}(s_j^i - \bar{s})(f_i - \bar{f})}{(N-1)SD(s^i)SD(f)},$$

where $s^i_j$ is the score for entity j on risk indicator i; and $f_j$ is the fraud rate for entity j. If $r_i$ is larger than a pre-defined threshold, then the risk indicator is selected.

In one embodiment, the entity scoring model 150 combines each of the risk indicator scores for a particular entity using a weighted average or other suitable combining calculation to generate an overall entity score. In addition, the risk indicators having higher scores can also be identified and provided to the integrator 136.

In one embodiment, the combined score for a particular entity can be determined using one or more of the following models:

An equal weight average:

$$S_c = \frac{1}{N}\sum_{i=1}^{N} s^i,$$

where N is the number of risk indicators;

A weighted average:

$$S_c = \frac{1}{N}\sum_{i=1}^{N} s^i \alpha^i,$$

where N is the number of risk indicators and $\alpha^i$ is estimated based on how predictive risk indicator i is on individual loan level α;

A competitive committee:

$$S_c = \frac{1}{M}\sum_{i=1}^{M} s^i,$$

where $s^i \epsilon$(set of largest M risk indicator scores).

If entity fraud rate or entity performance data (EPD: not to be confused with EPD as defined below) rate is available, the fraud/EPD rate can be incorporated with entity committee score to generate the combined entity score. The entity score S_E, can be calculated using one of the following equations:

$$S_E = S_C \text{ if relative entity fraud/EPD rate} \leq 1;$$

$$S_E = S_D + \min(\alpha^* \max(\text{absoluteFraudRate}, \text{absoluteEP-DRate}), 0.99)(998-S_D), \text{ if relative entity fraud/EPD rate} > 1 \text{ and } S_C < S_D.$$

$$S_E = S_C \min(\alpha^* \max(\text{absoluteFraudRate}, \text{absoluteEP-DRate}), 0.99)(998-S_C), \text{ where } \alpha = b^* \tan h(\alpha^*(\max(\text{relativeFraudRate}, \text{relativeEPDRate})-1)).$$

The preprocessing module 124 can also provide application data to a risky file processing module 156. In addition to application data, the risky file processing module 156 is configured to receive files from a risky files database 154. "Risky" files include portions of applications that are known to be fraudulent. It has been found that fraudulent applications are often resubmitted with only insubstantial changes in application data. The risky file processing module 156 compares each application to the risky files database 154 and flags applications that appear to be resubmissions of fraudulent applications. In one embodiment, risky file data is provided to the integrator 136 for integration into a combined fraud score or report.

The integrator 136 can be configured to apply weights and for processing rules to generate one or more scores and risk indicators based on the data indicative of fraud provided by one or more of the loan models 132, the entity models 140 and entity scoring modules 160, and the risky file processing module 156. In one embodiment, the risk indicator 136 generates a single score indicative of fraud along with one or more risk indicators relevant for the particular application. Additional scores can also be provided with reference to each of the risk indicators. The integrator 136 can provide this data to a scores and risk indicators module 160 that logs the scores to an output history database 160. In one embodiment, the scores and risk indicators module 160 identifies applications for further review by the risk manager 108 of FIG. 1. Scores can be real or integer values.

In another embodiment, scores are numbers in the range of 1-999. In one embodiment, thresholds are applied to one or more categories to segment scores into high and low risk categories. In one embodiment, thresholds are applied to identify applications for review by the risk manager 108. In one embodiment, risk indicators are represented as codes that are indicative of certain data fields or certain values for data fields. Risk indicators can provide information on the types of fraud and recommended actions. For example, risk indicators might include a credit score inconsistent with income, high risk geographic area, etc. Risk indicators can also be indicative of entity historical transactions, e.g., a broker trend that is indicative of fraud.

A score review report module 162 can generate a report ir, or,e or more formats based on scores and risk indicators provided by the scores and risk indicators module 160. In one embodiment, the score review report module 162 identifies loan applications for review by the risk manager 108 of FIG. 1. One embodiment desirably improves the efficiency of the risk manager 108 by identifying applications with the highest fraud scores or with particular risk indicators for review thereby reducing the number of applications that need to be reviewed. A billing process 166 can be configured to generate billing information based on the results in the output history.

In one embodiment, the model generator 110 receives application data, entity data, and data on fraudulent and non-fraudulent applications and generates and updates models such as the entity models 140 either periodically or as new data is received.

Figure 3:
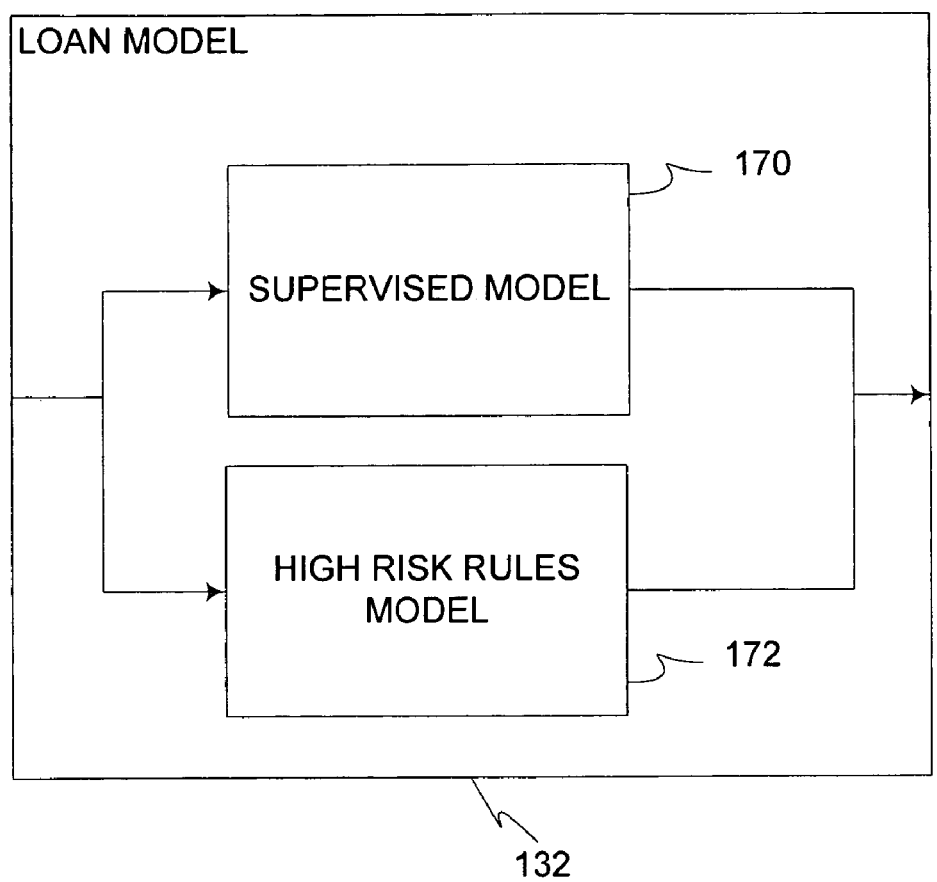
FIG. 3 is a functional block diagram illustrating an example of loan models that can be included in the fraud detection system of FIG. 2.

FIG. 3 is a functional block diagram illustrating an example of the loan models 132 in the fraud detection system 100. In one embodiment, the loan models 132 can include one or more supervised models 170 and high risk rules models 172. Supervised models 170 are models that are generated based on training or data analysis that is based on historical transactions or applications that have been identified as fraudulent or non-fraudulent. Examples of implementations of supervised models 170 include scorecards, naive Bayesian, decision trees, logistic regression, and neural networks. Particular embodiments can include one or more such supervised models 170.

The high risk rules models 172 can include expert systems, decision trees, and for classification and regression tree (CART) models. The high risk rules models 172 can include rules or trees that identify particular data patterns that are indicative of fraud. In one embodiment, the high risk rules model 172 is used to generate scores and/or risk indicators. In one embodiment, the rules, including selected data fields and condition parameters, are developed using the historical data used to develop the loan model 170. A set of high risk rule models 172 can be selected to include rules that have low firing rate and high hit rate. In one embodiment, when a rule i is fired, it outputs a score: $s_{rule}^i$. The score represents the fraud risk associated to the rule. The score can be a function of:

$$s_{rule}^i = f(\text{hitRateOfRule}^i, \text{firingRateOfRule}^i, \text{scoreDistributionOfloanAppModel}), \text{ and}$$

$$S_{rule} = \max(S_{rule}^1 \ldots S_{rule}^N).$$

In one embodiment, the loan models 170 and 172 are updated when new versions of the system 100 are released into operation. In another embodiment, the supervised models 170 and the high risk rules models 172 are updated automatically. In addition, the supervised models 170 and the high risk rules models 172 can also be updated such as when new or modified data features or other model parameters are received.

Figure 4:
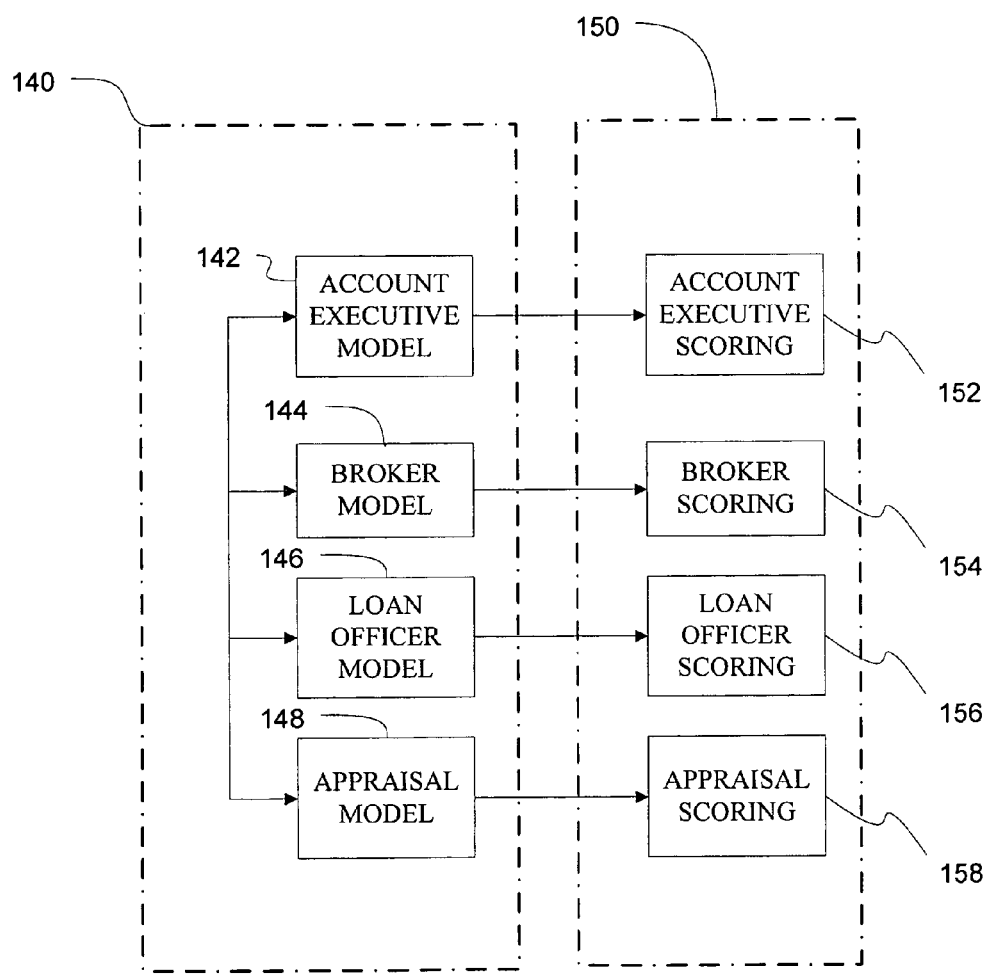
FIG. 4 is a functional block diagram illustrating examples of entity models that can be included in the fraud detection system of FIG. 2.

FIG. 4 is a functional block diagram illustrating examples of the entity models 140 in the fraud detection system 100. It has been found that fraud detection performance can be increased by including models that operate on entities associated with a mortgage transaction that are in addition to the mortgage applicant. Scores for a number of different types of entities are calculated based on historical transaction data. The entity models can include one or more of an account executive model 142, a broker model 144, a loan officer model 146, and an appraiser (or appraisal) model 148. Embodiments can also include other entities associated with a transaction such as the lender. For example, in one embodiment, an unsupervised model, e.g., a clustering model such as k-means, is applied to risk indicators for historical transactions for each entity. A score for each risk indicator, for each entity, is calculated based on the relation of the particular entity to the clusters across the data set for the particular risk indicator.

By way of a simple example, for a risk indicator that is a single value, e.g., loan value for a broker, the difference between the loan value of each loan of the broker and the mean (assuming a simple Gaussian distribution of loan values) divided by the standard deviation of the loan values over the entire set of historical loans for all brokers might be used as a risk indicator for that risk indicator score. Embodiments that include more sophisticated clustering algorithms such as k-means can be used along with multidimensional risk indicators to provide for more powerful entity scores.

The corresponding entity scoring module 150 for each entity (e.g., account executive scoring module 152, broker scoring module 154, loan officer scoring module 156, and appraisal scoring module 158) can create a weighted average of the scores of a particular entity over a range of risk indicators that are relevant to a particular transaction.

Figure 5:
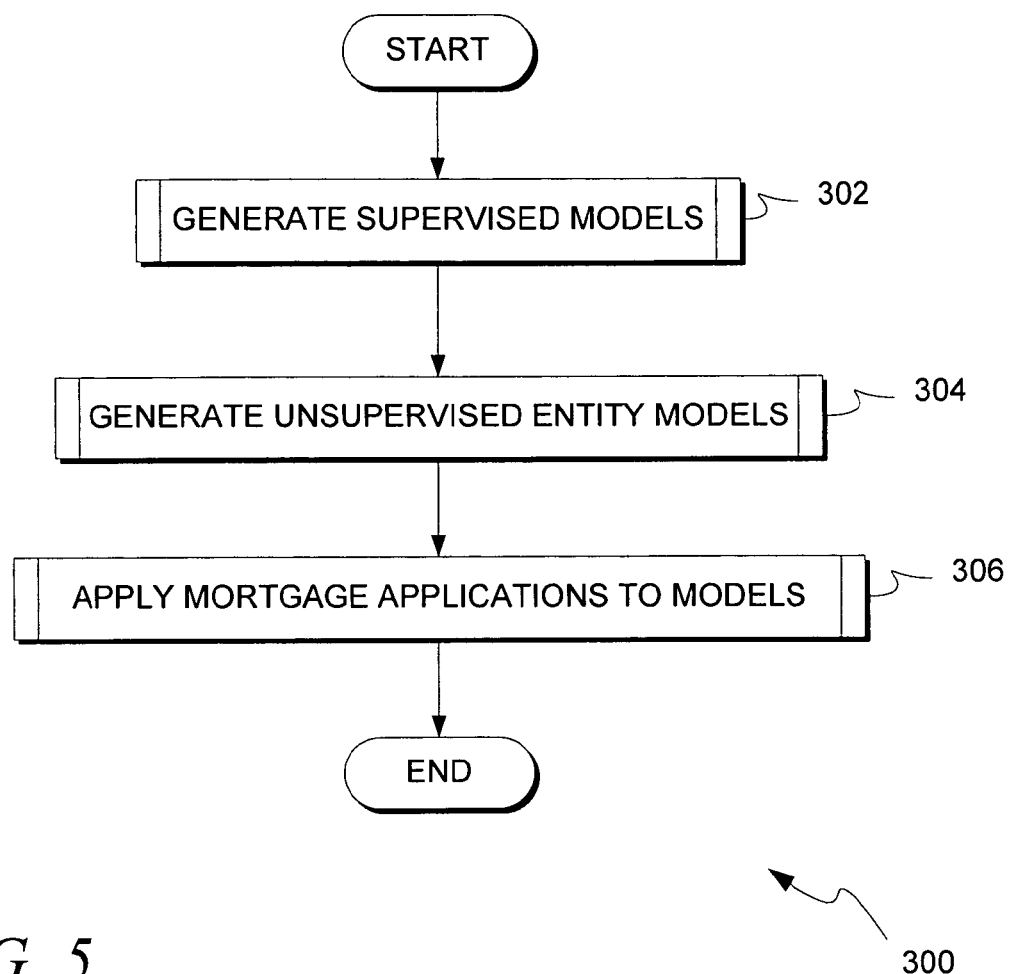
FIG. 5 is a flowchart illustrating model generation and use in the fraud detection system of FIG. 2.

FIG. 5 is a flowchart illustrating a method 300 of operation of the fraud detection system 100. The method 300 begins at a block 302 in which the supervised model is generated. In one embodiment, the supervised models 170 are generated based on training or data analysis that is based on historical transactions or applications that have been identified as fraudulent or non-fraudulent. Further details of generating supervised models are discussed with reference to FIG. 7. Moving to a block 304, the system 100 generates one or more unsupervised entity models such as the account executive model 142, the broker model 144, the loan officer model 146, or the appraiser (or appraisal) model 148. Further details of generating unsupervised models are discussed with reference to FIG. 8. Proceeding to a block 306, the system 100 applies application data to models such as supervised models 132 and entity models 150. The functions of block 306 can be repeated for each loan application that is to be processed. Further detail of applying data to the models is described with reference to FIG. 6.

In one embodiment, the model generator 110 generates and/or updates models as new data is received or at specified intervals such as nightly or weekly. In other embodiments, some models are updated continuously and others at specified intervals depending on factors such as system capacity, mortgage originator requirements or preferences, etc. In one embodiment, the entity models are updated periodically, e.g., nightly or weekly while the loan models are only updated when new versions of the system 100 are released into operation.

Figure 6:
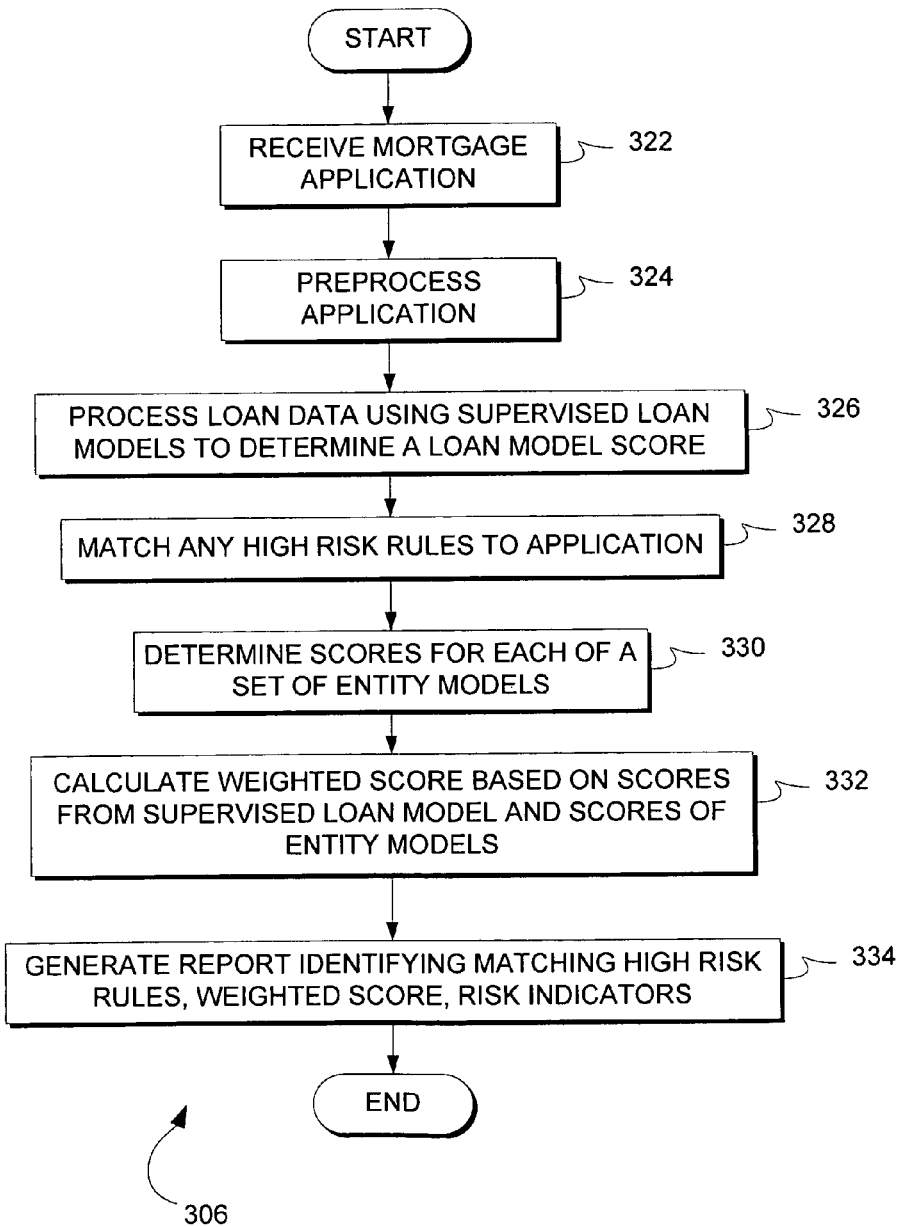
FIG. 6 is a flowchart illustrating an example of using models in the fraud detection system of FIG. 2.

FIG. 6 is a flowchart illustrating an example of a method of performing the functions of the block 306 of FIG. 5 of using models in the fraud detection system 100 to process a loan application. The function 306 begins at a block 322 in which the origination system interface 122 receives loan application data. Next at a block 324, the data preprocessing module 124 preprocesses the application 324 as discussed above with reference to FIG. 2.

Moving to a block 326, the application data is applied to the supervised loan models 170 which provide a score indicative of the relative likelihood or probability of fraud to the integrator 136. In one embodiment, the supervised loan models 170 can also provide risk indicators. Next at a block 328, the high risk rules model 172 is applied to the application to generate one or more risk indicators, and/or additional scores indicative of fraud. Moving to a block 330, the application data is applied to one or more of the entity models 140 to generate additional scores and risk indicators associated with the corresponding entities of the models 140 associated with the transaction.

Next at a block 332, the integrator 136 calculates a weighted score and risk indicators based on scores and risk indicators from the supervised loan model 170, the high risk rules model 172, and scores of entity models 140. In one embodiment, the integrator 136 includes an additional model, e.g., a trained supervised model that combines the various scores, weights, and risk factors provided by the models 170, 172, and 140.

Moving to a block 334, the scores and risk indicators module 160 and the score review report module 162 generate a report providing a weighted score along with one or more selected risk indicators. The selected risk indicators can include explanations of potential types of frauds and recommendations for action.

Figure 7:
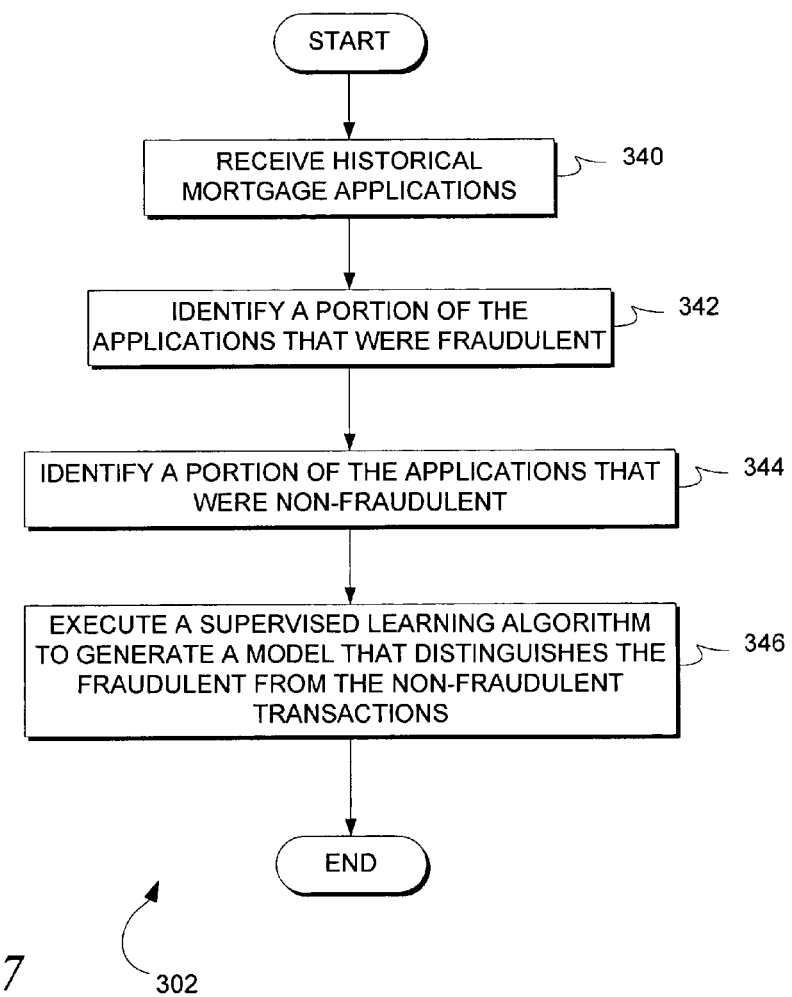
FIG. 7 is a flowchart illustrating an example of generating a supervisory model in the fraud detection system of FIG. 2.

FIG. 7 is a flowchart illustrating an example of a method of performing the block 302 of FIG. 5 of generating the loan models 132 in the fraud detection system 100. Supervised learning algorithms identify a relationship between input features and target variables based on training data. In one embodiment, the target variables comprise the probability of fraud. Generally, the models used can depend on the size of the data and how complex a problem is. For example, if the fraudulent exemplars in historical data are less than about 5000 in number, smaller and simpler models can be used, so robust model parameter estimation can be supported by the data size. The method 302 begins at a block 340 in which the model generator 110 receives historical mortgage data. The model generator 110 can extract and convert client historical data according to internal development data specifications, perform data analysis to determine data quality and availability, and rectify anomalies, such as missing data, invalid data, or possible data entry errors similar to that described above with reference to preprocessing module 124 of FIG. 2.

In addition, the model generator 110 can perform feature extraction including identifying predictive input variables for fraud detection models. The model generator 110 can use domain knowledge and mathematical equations applied to single or combined raw input data fields to identify predictive features. Raw data fields can be combined and transformed into discriminative features. Feature extraction can be performed based on the types of models for which the features are to be used. For example, linear models such as logistic regression and linear regression, work best when the relationships between input features and the target are linear. If the relationship is non-linear, proper transformation functions can be applied to convert such data to a linear function. In one embodiment, the model generator 110 selects features from a library of features for use in particular models. The selection of features can be determined by availability of data fields, and the usefulness of a feature for the particular data set and problem. Embodiments can use techniques such as filter and wrapper approaches, including information theory, stepwise regression, sensitivity analysis, data mining, or other data driven techniques for feature selection.

In one embodiment, the model generator 110 can segment the data into subsets to better model input data. For example, if subsets of a data set are identified with significantly distinct behavior, special models designed especially for these subsets normally outperform a general fit-all model. In one embodiment, a prior knowledge of data can be used to segment the data for generation of models. For example, in one embodiment, data is segregated geographically so that, for example, regional differences in home prices and lending practices do not confound fraud detection. In other embodiments, data driven techniques, e.g., unsupervised techniques such as clustering, are used to identify data segments that can benefit from a separate supervised model.

Proceeding to a block 342, the model generator 110 identifies a portion of the applications in the received application data (or segment of that data) that were fraudulent.

In one embodiment, the origination system interface 122 provides this labeling. Moving to a block 344, the model generator 110 identifies a portion of the applications that were non-fraudulent. Next at a block 346, the model generator 110 generates a model such as the supervised model 170 using a supervised learning algorithm to generate a model that distinguishes the fraudulent from the non-fraudulent transactions. In one embodiment, CART or other suitable model generation algorithms are applied to at least a portion of the data to generate the high risk rules models 172.

In one embodiment, historical data is split into multiple non-overlapped data sets. These multiple data sets are used for model generation and performance evaluation. For example, to train a neural network model, the data can be split into three sets, training set 1, training set 2, and validation. The training set 1 is used to train the neural network. The training set 2 is used during training to ensure the learning converge properly and to reduce over-fitting to the training set 1. The validation set is used to evaluate the trained model performance. Supervised models can include one or more of scorecards, naive Bayesian, decision trees, logistic regression, and neural networks.

Figure 8:
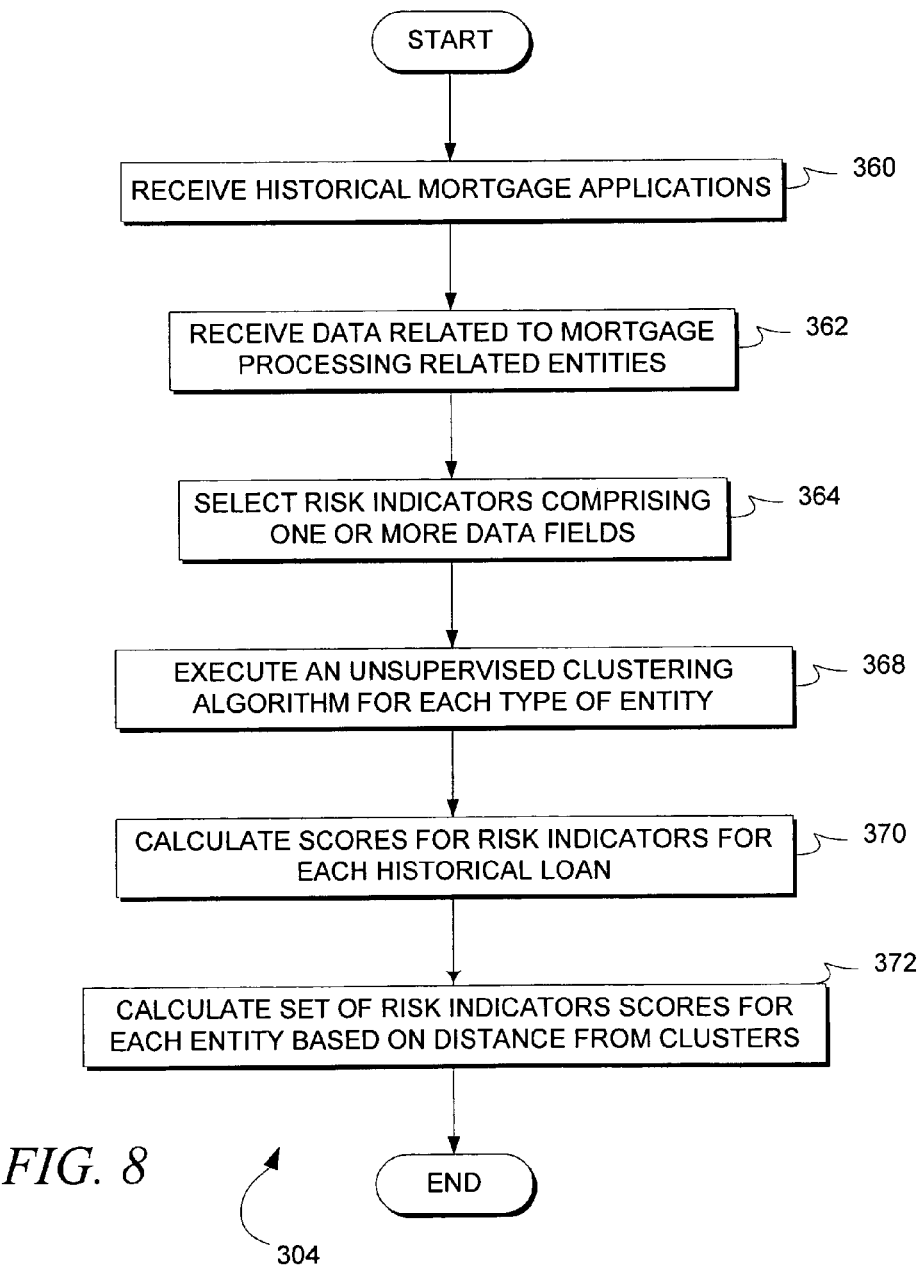
FIG. 8 is a flowchart illustrating an example of generating entity models in the fraud detection system of FIG. 2.

FIG. 8 is a flowchart illustrating an example of a method of performing the block 304 of FIG. 5 of generating entity models 140 in the fraud detection system 100. The method 304 begins at a block 360 in which the model generator 110 receives historical mortgage applications. The model generator 110 can perform various processing functions such as described above with reference to the block 340 of FIG. 7. Next at a block 362, the model generator 110 receives data related to mortgage processing related entities such as an account executive, a broker, a loan officer, or an appraiser. Moving to a block 364, the model generator 110 selects risk indicators comprising one or more of the input data fields. In one embodiment, expert input is used to select the risk indicators for each type of entity to be modeled. In other embodiments, data driven techniques such as data mining are used to identify risk indicators.

Next at a block 368, the model generator 110 performs an unsupervised clustering algorithm such as k-means for each risk indicator for each type of entity. Moving to a block 370, the model generator 110 calculates scores for risk indicators for each received historical loan based on the data distance from data clusters identified by the clustering algorithm. For example, in a simple one cluster model where the data is distributed in a normal or Gaussian distribution, the distance can be a distance from the mean value. The distance/score can be adjusted based on the distribution of data for the risk indicator, e.g., based on the standard deviation in a simple normal distribution. Moving to a block 372, scores for each risk indicator and each entity are calculated based on model, such as a weighted average of each of the applications associated with each entity. Other embodiments can use other models.

As noted above Early Payment Default (EPD) can also reduce the value of loans and increase risk for lenders. Accordingly, certain embodiments descried herein are directed to detecting EPD instead of, or in addition to fraud. For example, various embodiments of an early payment default (EPD) alert system are described herein. Generally, such a system can employ statistical pattern recognition to generate a score designed to assess the risk of early payment default in mortgage applications and loans. In one embodiment, such a system can use advanced analytic scoring technology that enables mortgage lenders, investment banks, and servicers to score and identify each loan's early payment default risk in real-time during the underwriting process, before a new loan is funded, before it is purchased on the secondary market, and during the loan servicing cycle. Such an EPD alert can provide a sophisticated, analytics-based solution to help curtail the growing problem of early mortgage defaults.

In one embodiment, an EPD alert system as described herein uses pattern recognition technology to find early payment default risk based on historical patterns of both performing and non-performing mortgage loans from the a database of historical loans. These analytic models accurately predict the likelihood of a loan defaulting early, resulting in financial loss to the lender or investor. As will be discussed in more detail below, the systems and methods related to EPD alert systems can be described in a similar fashion as the embodiments for detecting mortgage related fraud described above. For example, a process similar to that of FIG. 6 can be employed in an EPD alert system, wherein steps 326, 328 and 330 would be customized and directed to detecting early payment default.

As such, an EPD alert system can be a complementary system used with systems and methods for detecting fraud, credit, and compliance risk, such as those described above, used during the loan underwriting, loan trading due diligence, and servicing processes to specifically identify early default risk. One embodiment of an EPD alert system can include a model configured to detect early payment default and improve the identification of EPD risk over traditional credit scores.

Lenders can score new loan applications and select the highest scoring, e.g., within a specified cutoff, of applications for a further targeted review. For example, when used by investment banks in evaluating loan pools for purchase on the secondary market, one embodiment of an EPD alert system uses the limited bid tape data to identify high risk loans, which are then selected for further due diligence review. An EPD alert system as described herein can provide both a risk score and specific risk indicators that help guide and expedite the investigative process.

Again, embodiments of such an EPD alert system can be used independently or in conjunction with a score indicative of the likelihood of fraud to identify both mortgage fraud and EPD risk prior to funding or loan purchase, or during servicing of the loan. In one embodiment, for example, the EPD alert system is part of a suite of fraud detection and risk management software designed to provide analytic solutions to the mortgage industry. One such system is described in co-pending U.S. patent application Ser. No. 11/526,208, filed Sep. 26, 2006, which is hereby incorporated by reference.

In one embodiment, an EPD model can be generated using a supervised learning model (step 302) that uses examples of loans with and without early payment default to effectively learn how to generate a score that represents the likelihood of a loan defaulting during a particular portion of the life of the loan, e.g., the first, second or third payment, without anticipated cure. The score can be a value in a particular range, e.g., 1-999 with high scores indicating highest risk of payment default. It should be noted that the payment default can be early payment default, or a default that occurs over a longer period.

There is overlap between detection of fraud and prediction of early payment default, since a portion of EPD can be due to fraud, and a portion of such fraud is therefore reflected in the models of an EPD alert system described herein. By focusing the pattern recognition detection on specific targets for each model, high risk fraud and/or credit risk loans are detected. In one embodiment, the models are specifically focused on predicting payment risk of financial loss to the lender.

One embodiment provides an operational workflow that uses both scores in a cascading risk management process for a more comprehensive assessment of fraud and early payment default risk. Studies with lenders determined that additional savings result from the combined model approach. For example, with reference to FIG. 3, such a cascaded approach can involve receiving mortgage data (step 322) and preprocessing an application (step 324). In this case, however, loan data can be processed using EPD loan models 932 (see FIG. 10) instead of supervised loan models 132 in order to detect the potential for EPD. High risk rules can be matched to the application in step 328 based on the modeling of step 326 and a score can be determined for entity models in step 330, if entity models are being used. In step 332, a calculated weighted score can be determined for EPD and a report can be generated in step 334.

The process up to this point is discussed for EPD in more detail below and with respect to the systems illustrated in FIGS. 9 and 10.

But in certain embodiments, the fraud analysis process described above can be performed, either after or in parallel with the process for EPD detection. For example, in certain embodiments, the results of the EPD process can be used to prioritize applications for the fraud analysis. The codes in table 2 can be used, for example, to identify applications that are a high risk for EPD that are also a high risk for fraud. These applications can then be prioritized for the fraud process.

While EPD losses can have an immediate impact to a lender, fraud is also a significant issue whether the loan is held or sold. It has been determined that the largest impacts of fraud are often felt by originators 6, 12 and even 18 months after the loan is funded through repurchase requests and defaults due to larger scale fraudulent payment manipulation schemes and appraisal inflation schemes. Mitigating future loss and ensuring the stability of reserves can be improved by the use of predictive analytics that address both EPD and fraud.

Fraud misrepresentation of a loan is typically detected through a review of the loan file, with occasional use of external data. Risk of early payment default, on the other hand, requires research into the financial viability of the applicant. Thus, the income stability and accuracy/existence of assets should be confirmed. Total debt should be reviewed to see if there are obvious expenses missing, or indications that debt is rising. Analysis of the credit report can provide insight into the trend of the debt-to-income ratio, and provide an indication that the applicant's financial viability might be worsening.

Thus, additional risk factors can be included in the supervisory models 170 used for EPD detection native to fraud detection. Those factors can broadly be defined as: borrower's risk, geographic risk, borrower's affordability, and property valuation risk.

Borrower's risk can include information such as a credit score, payment history, employment information, tenure in current employment position, debt, income, occupancy, etc. This information can be used to evaluate the risk factors associated with the borrower. For example, if the buyer has a risky credit score or employment, then they may be a higher risk for EPD and the EPD models 932 can take this into account as can the weighting factors applied by, e.g., integrator 936.

Property appraisal information and the geographic location of the property can also be used to determine the EPD risk. For example, the property may be overvalued relative to other properties in the area and/or the area may have a high rate of defaults. Thus, such information can be used in models 932 to determine a geographic risk factor and/or a property valuation risk factor.

These factors can be associated with alerts that can be output by the scores and risk indicators block 960. Table 2 lists example alert codes some of which can be associated with these and other risk factors.

An EPD alert score can be used alone or in combination with a mortgage fraud score to identify loans (or applications) for further review. In one embodiment, the EPD alert score suggested areas to begin a user's loan investigation. By starting with the highest fraud scores, risk managers are provided a way to use a fraud checklist and verifications to confirm if fraud exists. Presence of fraud provides assurance in the decision to not fund or purchase the loan due to the immediate confirmation of the problem. The remaining loans can then be researched if they contain high scoring EPD alerts, and a determination made about whether the applicant shows indications they will not be able to make their payments. An EPD alert model can have some common variables with the mortgage fraud detection system, but each model should have specific variables to predict the targeted outcome. While fraud and EPD can both occur on the same loan, it has been found that other fraud behavior and credit risk-specific EPD mean that the performance is not the same. Each model can contribute uniquely to the total risk assessment.

Embodiments can use a timeframe for the target definition of EPD that is selected to most closely match what lenders typically measure, and that are associated with the most issues for EPD whether the loan is held or sold. In one embodiment, the model targets detecting early payment default in the first few months after funding. But it will be understood that the probability for payment default can be detected for any time period after loan funding or adjustments.

In one embodiment, the EPD model is based on data combining multiple sources of information, e.g., which contain loan application and performance data from lenders that is broader than the mortgage loan data typically available through the credit bureau. An EPD model as described herein can target detection of early payment default in mortgage loans, in contrast to credit models that can have broader targets such as delinquency in 24 months within all credit relationships, or bankruptcy. Given the high impact of early payment defaults on lenders, such an EPD model is better suited to mortgage use.

In particular, an EPD alert system as described herein can be designed to prevent early payment defaults that can result in severe loss scenarios such as foreclosure or repurchase. In one embodiment, the models used target mortgage-related behavior, rather than a broad credit risk model that detects problems such as bankruptcy or charge-off Feature Extraction is the process of designing predictive input variables for fraud and EPD detection models. Feature extraction can be performed using other models, alone or with input from human analysts. These predictive features are derived from the raw data fields in the loan application data and are calculated on each loan during model processing. The quality of the predictive features is measured by their ability to separate good from bad loans. The final models make use of such identified features to improve predictive performance.

In one embodiment, EPD model described herein incorporates variables related to the presence of a co-borrower on the loan. In one embodiment, the system outputs risk indicators, which can be used for further analysis of the loan. The risk indicators represent the factors that contribute the most to the level of early payment default risk for each loan. In one embodiment, the risk indicators are statistically derived.

Based on risk level tolerance and operational considerations, cut-offs can be established for the models. In one embodiment, the system can also perform a historical evaluation to help establish the appropriate strategy. A cascading risk management approach can assist in the operational efficiency of implementing the fraud+EPD risk assessment.

The EPD alert system can produce a result in real time or in a report that can be accessed in a batch mode. The model output file can contain a combination of the results of applying loan data to both the fraud detection system and the EPD alert system in a single file.

The scores enable a focused investigation of the risk. In addition, the indicators and suggested actions help tailor the loan review for efficiency, based on the factors contributing to the risk. Lenders can use cascading risk decision criteria to streamline the review for fraud and EPD risk assessment provided by the models.

Lenders can use the EPD score to determine the loans with highest risk of early payment default. Based on the results of an investigation, lender policies and fair lending guidelines, a loan application could have additional conditions placed on it, or be declined. Thus, an EPD alert system, such as system 901 (see FIG. 9) can process mortgage data and provide an EPD risk alert and likely reason for the alert. The alert can, in certain embodiments also be used in the loan processing or to prioritize certain applications for fraud analysis. Example risk alerts can include whether the applicant's patent score falls within a range that correlates with a high level of defaults, whether the income level is in a range that correlates with a high level of defaults, whether the property zip code is in an area with high defaults, etc.

Figure 9:
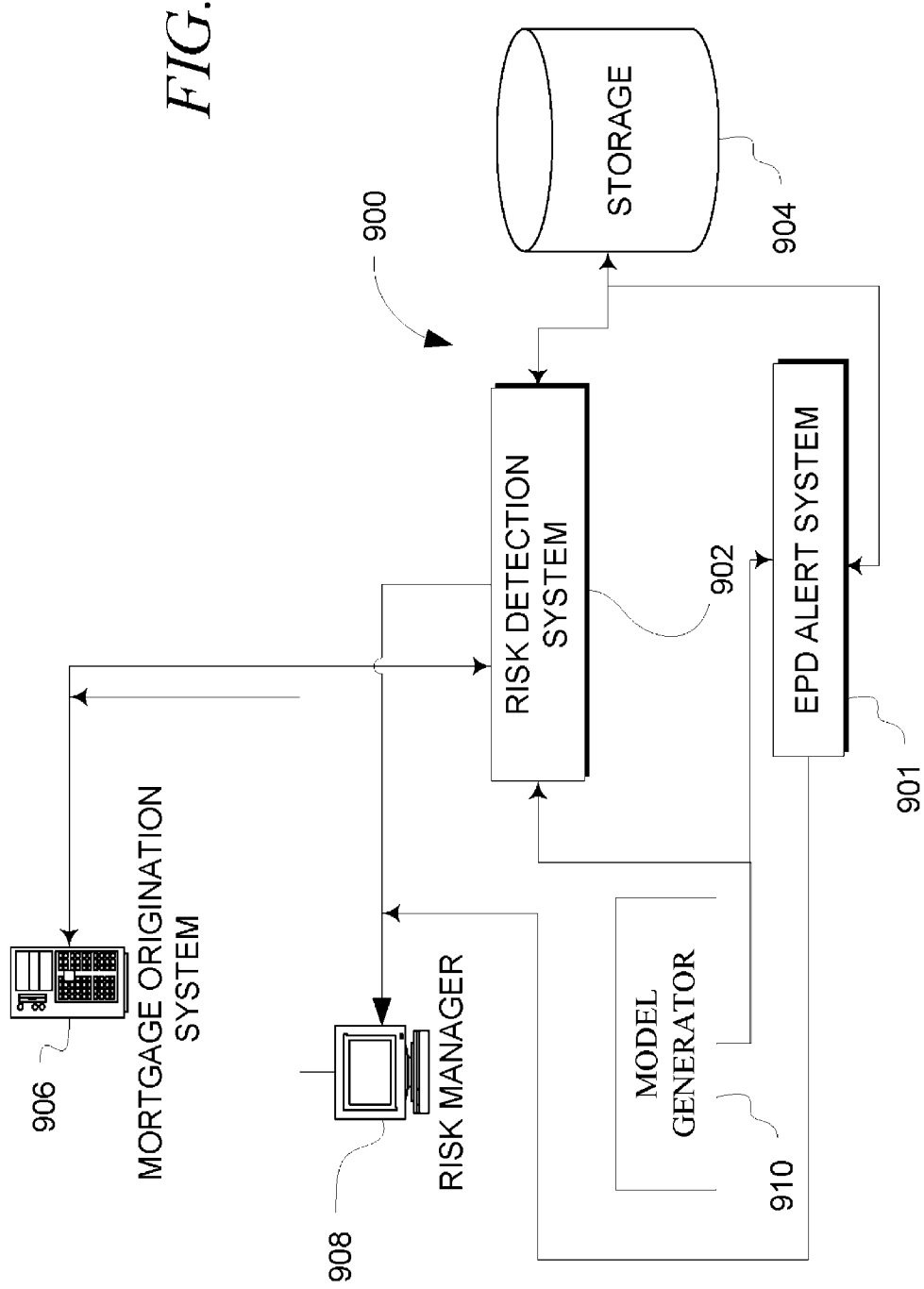
FIG. 9 is a functional block diagram illustrating a payment default detection system such as for use with a mortgage origination system.

FIG. 9 is a functional block diagram illustrating a system 900 for EPD detection such as for use with a mortgage origination system 906. In other embodiments, the system 900 can be used to analyze applications for use in evaluating applications and/or funded loans by an investment bank or servicer, or as part of due diligence of a loan portfolio. System 900 can comprise a mortgage origination system configured to provide mortgage data related to mortgage applications; a risk detection system 902, which can be configured to detect fraud risk associated with the mortgage applications as described with respect to FIGS. 1 and 2; a EPD alert system 901, which can be configured to assess the EPD risk for the mortgage applications; and a model generator 910 that can generate models for use by risk detection system 902 and EPD alert system 901.

The EPD alert system 901 can receive and store data in a storage 904. The storage 904 can comprise one or more database servers and any suitable configuration of volatile and persistent memory. The system 901 can be configured to receive mortgage application data from the mortgage origination system 906 and provide data indicative of fraud and EPD alerts back to the mortgage origination system 906. In one embodiment, the system 901 uses one or more models to generate the data indicative of fraud and EPD risk. In one embodiment, data indicative of fraud and EPD risk can also be provided to a risk manager system 908 for further processing and/or analysis by a human operator. The analysis system 908 can be provided in conjunction with the system 901 or in conjunction with the mortgage origination system 906. In one embodiment, a fraud or other risk detection system 902 can be used in conjunction with, or share databases and other system components with, the EPD alert system 901.

Figure 10:
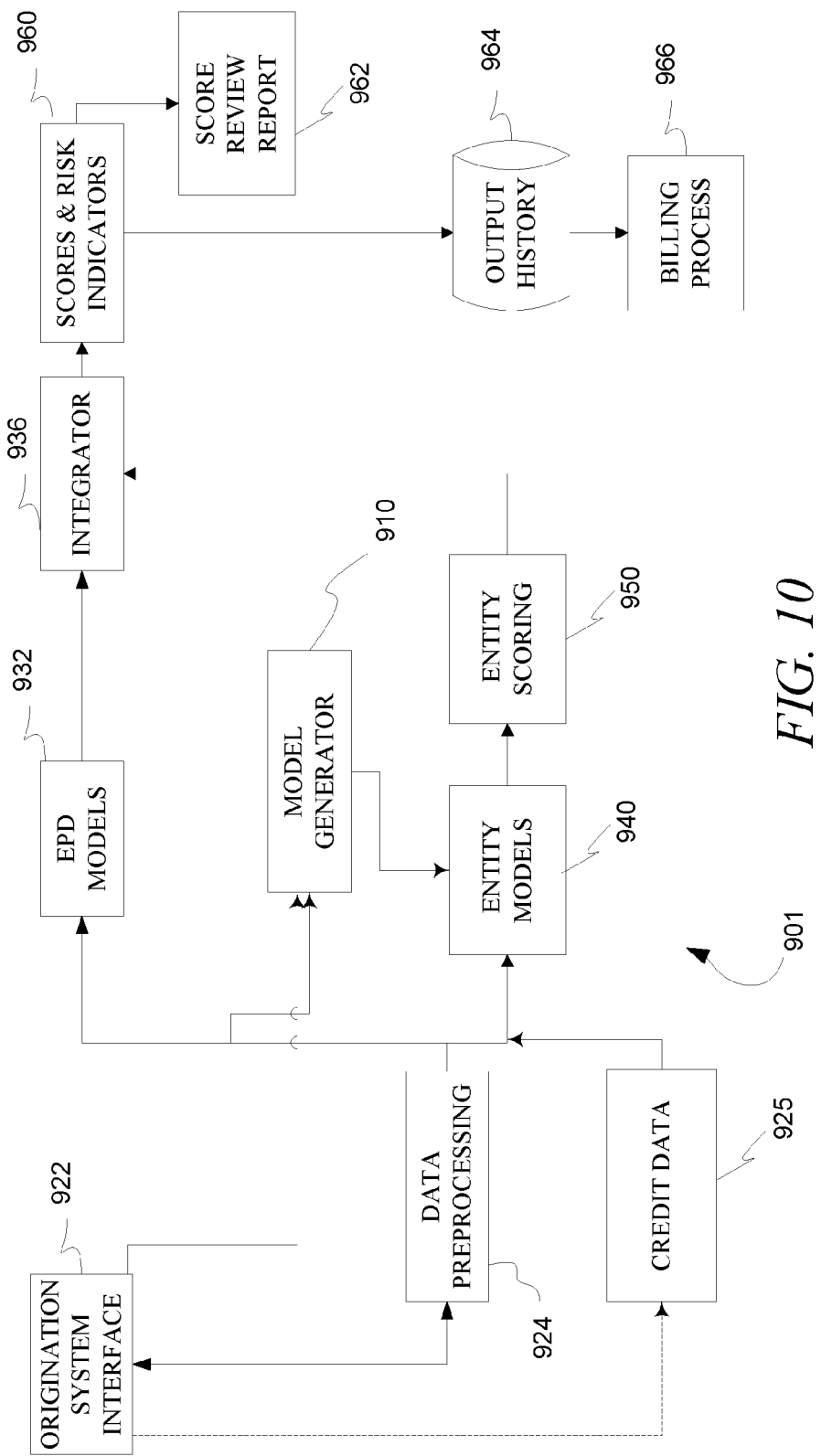
FIG. 10 is a functional block diagram illustrating an example of an payment default detection system in more detail.

FIG. 10 is a functional block diagram further illustrating an example of the EPD alert system 901. As can be seen, system 901 is similar to system 100, with EPD models 932 replacing the loan models 132 and the introduction of credit data 925. The system 901 can include an origination system interface 922 providing mortgage application data to a data preprocessing module 924. A credit data system 925 can be configured to receive applicant credit data from one or more credit bureaus or from the lender such as via the loan origination system interface 922 to store and provide that data to the EPD alert system 901. The origination system interface 922 can receive data from the mortgage origination system 906 of FIG. 9. In other embodiments, the origination system interface 922 can be configured to receive data associated with funded mortgages and can be configured to interface with suitable systems other than, or in addition to, mortgage origination systems. For example, in one embodiment, the system interface 922 can be configured to receive "bid tapes" or other collections of data associated with funded mortgages for use in evaluating EPD risk associated with a portfolio of funded loans. In one embodiment the origination system interface 922 can comprise a computer network that communicates with the origination system 906 to receive applications in real time or in batches. In one embodiment, the origination system interface 922 receives batches of applications via a data storage medium. The origination system interface 922 can provide application data to the data preprocessing module 924, which formats application data into data formats used internally in the system 901. For example, the origination system interface 922 can also provide data from additional sources such as the lender or directly from credit bureaus that can be in different formats for conversion by the data preprocessing module 924 into the internal data formats of the system 901. The origination system interface 922 and preprocessing module 924 also allow at least portions of a particular embodiment of the system 901 to be used to score EPD risk in different types of mortgage applications and for different loan originators that have varying data and data formats. Table 1 lists examples of mortgage application data that can be used in various embodiments.

The preprocessing module 924 can be configured to identify missing data values and provide data for those missing values to improve further processing. For example, the preprocessing module 924 can generate application data to fill missing data fields using one or more rules. Different rules can be used depending on the loan data supplier, on the particular data field, and/or on the distribution of data for a particular field. For example, for categorical fields, the most frequent value found in historical applications can be used. For numerical fields, the mean or median value of historical applications can be used.

The preprocessing module 924 can also be configured to identify erroneous data or missing data. In one embodiment, the preprocessing module 924 extrapolates missing data based on data from similar applications, or using default data values. The preprocessing module 924 can perform data quality analysis such as one or more of critical error detection, anomaly detection, and data entry error detection.

The data preprocessing module 924 can provide application data to one or more models for EPD risk scoring and processing. In one embodiment, application data is provided to one or more EPD models 932 that generate data indicative of EPD risk based on application and applicant data. The data indicative of EPD risk generated by the EPD models 932 can be provided to an integrator 936 that combines scores from one or more models into a final score. The data preprocessing module 924 can also provide application data to one or more entity models 940 that are configured to identify EPD risk based on data associated with entities involved in the processing of the application. Entity models can include models of data associated with loan brokers, loan officers or other entities involved in a loan application. More examples of such entity models 940 are illustrated with reference to FIG. 4. Each of the entity models can output data to an entity scoring module 950 that is configured to provide a score and/or one or more risk indicators associated with the application data.

The term "risk indicator" refers to data values identified with respect to one or more data fields that can be indicative of EPD risk.

Optionally, the entity scoring module 950 can provide scores associated with one or more risk indicators associated with the particular entity or application. For example, appraisal value in combination with zip code can be a risk indicator associated with an EPD model. In one embodiment, the entity scoring module 950 provides scores and indicators to the integrator 936 to generate a combined EPD risk score and/or set of risk indicators.

The integrator 936 can be configured to apply weights and/or processing rules to generate one or more scores and risk indicators based on the data indicative of EPD risk provided by one or more of the loan models 932, the entity models 940 and entity scoring modules 960. In one embodiment, the risk indicator 936 can generate a single score indicative of EPD risk along with one or more risk indicators relevant for the particular application. Additional scores can also be provided with reference to each of the risk indicators. The integrator 936 can provide this data to a scores and risk indicators module 960 that logs the scores to an output history database 960. In one embodiment, the scores and risk indicators module 960 can identify applications for further review by the risk manager 908 of FIG. 9. Scores can be real or integer values.

In one embodiment, scores are numbers in the range of 1-999. In one embodiment, thresholds are applied to one or more categories to segment scores into high and low risk categories. In one embodiment, thresholds are applied to identify applications for review by the risk manager 908. In one embodiment, risk indicators are represented as codes that are indicative of certain data fields or certain values for data fields. Risk indicators can provide information on the types of EPD risk and recommended actions. For example, risk indicators might include a credit score that falls within high % of default ranges, a high risk of default geographic area, etc. Risk indicators can also be indicative of entity historical transactions, e.g., a CLTV percentage that is indicative of EPD risk.

A score review report module 962 can generate a report in one or more formats based on scores and risk indicators provided by the scores and risk indicators module 960. In one embodiment, the score review report module 962 identifies loan applications for review by the risk manager 908 of FIG. 9. One embodiment desirably improves the efficiency of the risk manager 908 by identifying applications with the highest EPD risk scores or with particular risk indicators for review thereby reducing the number of applications that need to be reviewed. A billing process 966 can be configured to generate billing information based on the results in the output history.

Score review report module 962 can output a score report in several formats. In certain embodiments, the report can include information related to the fraud score as well as the EPD alert score. In other embodiments, only information related to the EPD alert score can be output. In either case, and depending on the embodiment, only the score results, e.g., including risk codes, likely reason codes, suggested action codes, etc., can be output, while in other embodiments this information can be combined with the input information, e.g., from table 1 as well.

In one embodiment, the model generator 910 receives application data, entity data, and data on EPD and non-EPD applications and generates and updates models such as the entity models 940 either periodically or as new data is received.

It is to be recognized that embodiments can combine the functions identified with various blocks of FIGS. 9 and 10 with those of a mortgage fraud detection system 100. In one embodiment, the score review report generator 962 can output reports that include both EPD risk information and data indicative of fraud.

It is to be recognized that depending on the embodiment, certain acts or events of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A system for detecting a risk of payment defaults, comprising:

non-transitory data storage that stores (1) mortgage data associated with a mortgage application that is associated with an applicant and (2) credit data related to the applicant; and a computer system comprising one or more processors, the computer system being coupled with the data storage and being configured to:

process model training data related to a plurality of historical mortgage transactions;

generate one or more models based at least partly on the model training data by a process that comprises at least one of:

identifying, within the plurality of historical mortgage transactions, historical mortgage transactions that resulted in a payment default and historical mortgage transactions that did not result in a payment default; and identifying input variables that are predictive of payment default based on the data related to the historical mortgage transactions; and determine a payment default risk score for the mortgage application based at least partly on (1) the one or more generated models, (2) the mortgage data associated with the mortgage application, and (3) the credit data related to the applicant.

2. The system of claim 1, wherein the computer system is further configured to generate report data indicative of a risk of payment default based at least partly on the payment default risk score.

3. The system of claim 2, wherein the computer system is further configured to generate the report data indicative of a risk of payment default by at least matching a plurality of high risk rules to the received mortgage data.

4. The system of claim 3, wherein the high risk rules are generated based on data related to historical mortgage transactions that resulted in a payment default.

5. The system of claim 4, wherein the report data comprises at least one risk indicator of payment default generated based on result of the high risk rules matching.

6. The system of claim 5, wherein the at least one risk indicator include a risk indicator reflective of at least one of a borrower's risk, a borrower's affordability risk, a property valuation risk, a geographic risk, or a combination thereof.

7. The system of claim 2, wherein the generated report data reflects a risk of early payment default occurring within a time period that is shorter than or equal to 18 months of a funding of a loan sought for by the mortgage application.

8. The system of claim 1, wherein the payment default risk score is reflective of one or more of:

a risk related to the applicant's credit data;

a risk related to an appraised value of a subject property in the mortgage application; and a risk related to the geographic area in which the subject property is located.

9. The system of claim 1, wherein the computer system is further configured to generate the one or more models based on a supervised model training technique.

10. The system of claim 1, wherein the model training data is segmented geographically to account for regional differences in home prices and lending practices.

11. The system of claim 1, wherein the computer system is configured to generate the one or more models by a process that comprises identifying, within the plurality of historical mortgage transactions, historical mortgage transactions that resulted in a payment default and historical mortgage transactions that did not result in a payment default.

12. The system of claim 1, wherein the computer system is configured to generate the one or more models by a process that comprises identifying input variables that are predictive of payment default based on the data related to the historical mortgage transactions.

13. A method for detecting a risk of payment default, comprising:

generating one or more models based at least partly on model training data related to a plurality of historical mortgage transactions, the generating comprising at least one of:

identifying, within the plurality of historical mortgage transactions, historical mortgage transactions that resulted in a payment default and historical mortgage transactions that did not result in a payment default; and identifying input variables that are predictive of payment default based on the data related to the historical mortgage transactions;

receiving mortgage data associated with a mortgage application that is associated with an applicant and credit data related to the applicant; and determining a payment default risk score for the mortgage application based at least partly on the one or more generated models, the mortgage data associated with the mortgage application, and the credit data related to the applicant, wherein the method is performed in its entirety by a computing system that comprises one or more computing devices.

14. The method of claim 13, further comprising generating report data indicative of a risk of payment default based at least partly on the payment default risk score.

15. The method of claim 14, wherein the high risk rules are generated based on data related to mortgage transactions that resulted in a payment default.

16. The method of claim 15, the report data comprises at least one risk indicator of payment default generated based on result of the high risk rules matching.

17. The method of claim 16, wherein the at least one risk indicator include a risk indicator reflective of at least one of a borrower's risk, a borrower's affordability risk, a property valuation risk, a geographic risk, or a combination thereof.

18. The method of claim 14, wherein the generated report data reflects a risk of early payment default occurring within a time period that is shorter than or equal to 18 months of a funding of a loan sought for by the mortgage application.

19. The method of claim 13, wherein the payment default risk score is reflective of one or more of:

a risk related to the applicant's credit data;

a risk related to an appraised value of a subject property in the mortgage application; and a risk related to the geographic area in which the subject property is located.

20. The method of claim 13, wherein generating the one or more models is based on a supervised model training technique.

21. The method of claim 13, wherein the model training data is segmented geographically to account for regional differences in home prices and lending practices.

22. The method of claim 13, wherein generating the report data indicative of a risk of payment default further comprises:

matching a plurality of high risk rules to the received mortgage data.

23. The method of claim 13, wherein generating the one or more models comprises identifying, within the plurality of historical mortgage transactions, historical mortgage transactions that resulted in a payment default and historical mortgage transactions that did not result in a payment default.

24. The method of claim 13, wherein generating the one or more models comprises identifying input variables that are predictive of payment default based on the data related to the historical mortgage transactions.

* * * * *

UNITED STATES PATENT AND TRADEMARK OFFICE
CERTIFICATE OF CORRECTION

PATENT NO. : 8,065,234 B2  
APPLICATION NO. : 13/162517  
DATED : November 22, 2011  
INVENTOR(S) : Yuansong Liao et al.

Page 1 of 1

It is certified that error appears in the above-identified patent and that said Letters Patent is hereby corrected as shown below:

Title page, in the third line of the "Related U.S. Application Data" item [63], change "continuation" to --continuation-in-part--.

Signed and Sealed this
Seventeenth Day of April, 2012

David J. Kappos
*Director of the United States Patent and Trademark Office*